May 7, 1963
J. R. YANCEY
3,088,480
FLOW CONTROL APPARATUS
Filed Sept. 7, 1960
3 Sheets-Sheet 1
FIG_1
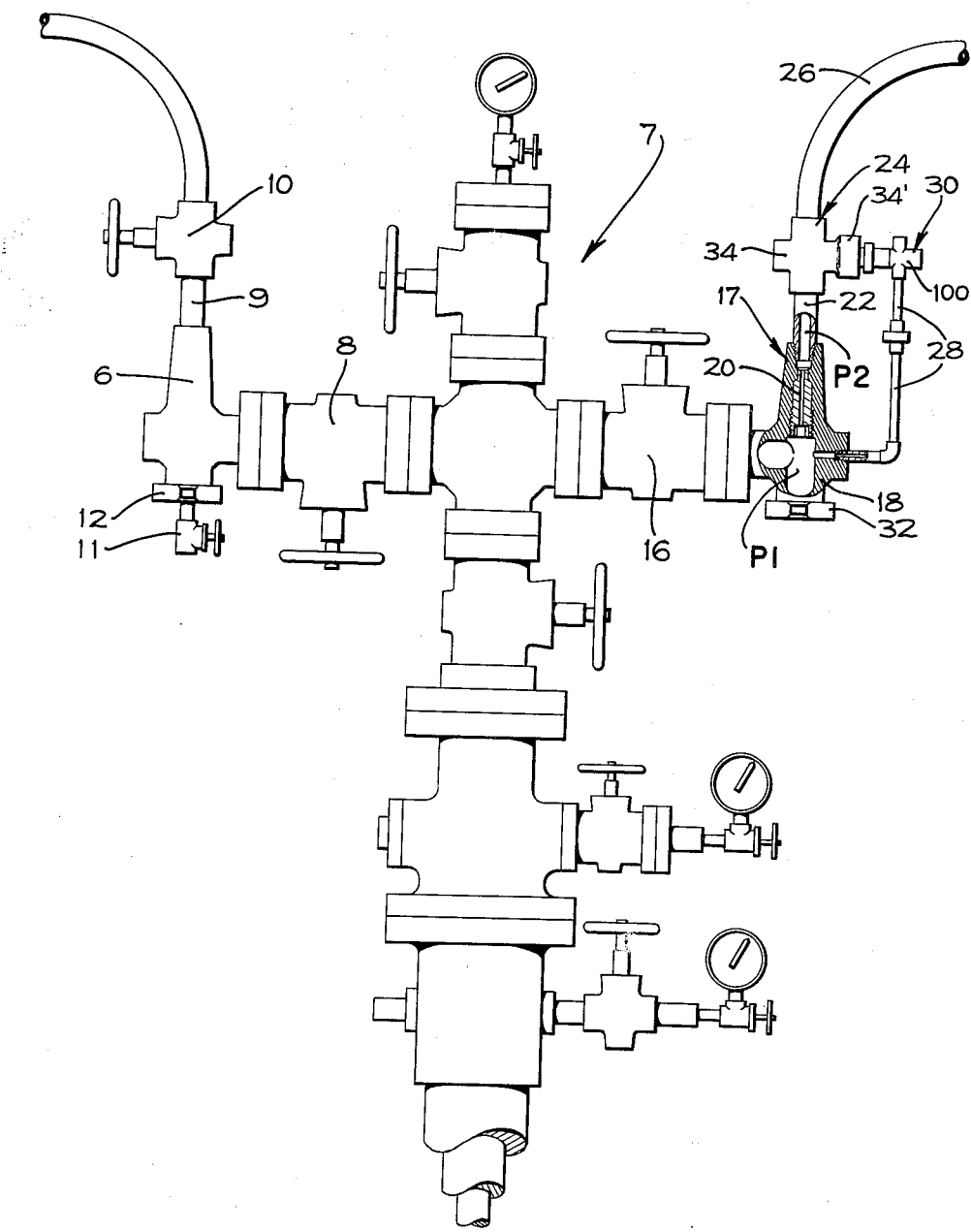
INVENTOR
JOHN R. YANCEY
BY Hans G. Hoffmeister
ATTORNEY May 7, 1963  J. R. YANCEY  3,088,480
FLOW CONTROL APPARATUS
Filed Sept. 7, 1960  3 Sheets-Sheet 2
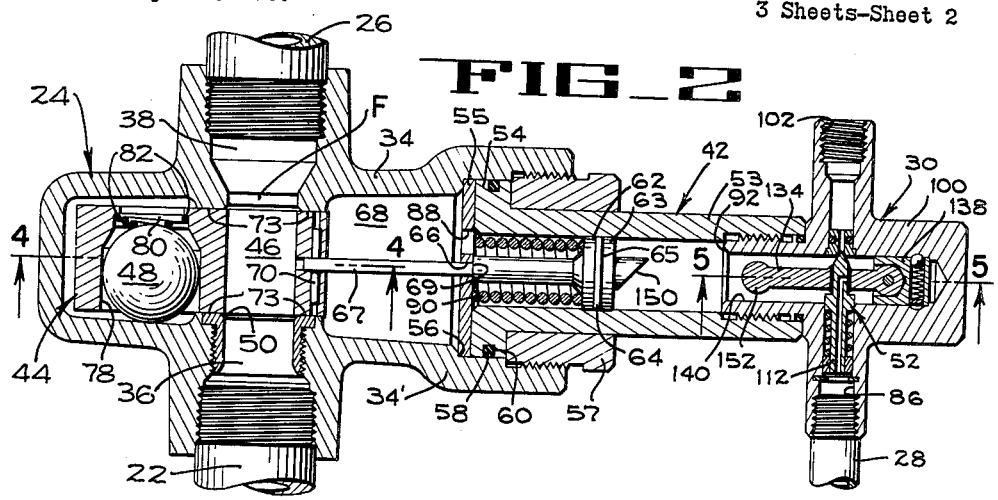
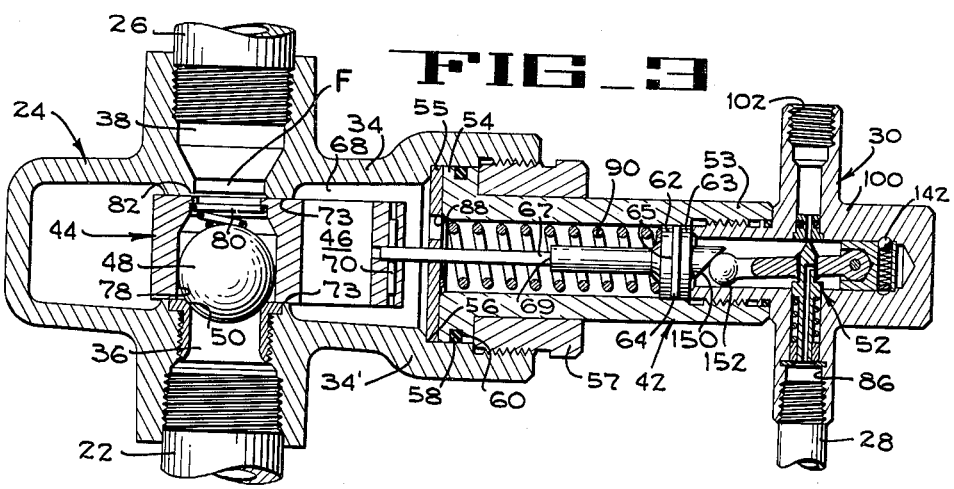
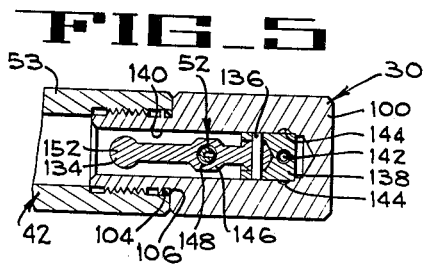
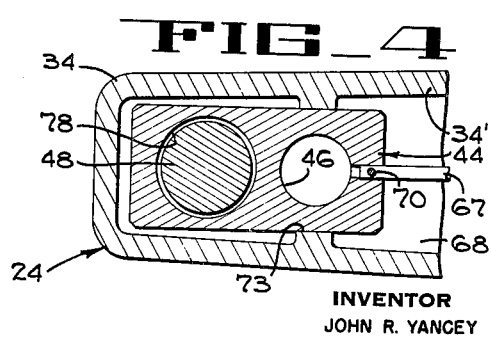
INVENTOR
JOHN R. YANCEY
BY *Hans G. Hofmeister*
ATTORNEY

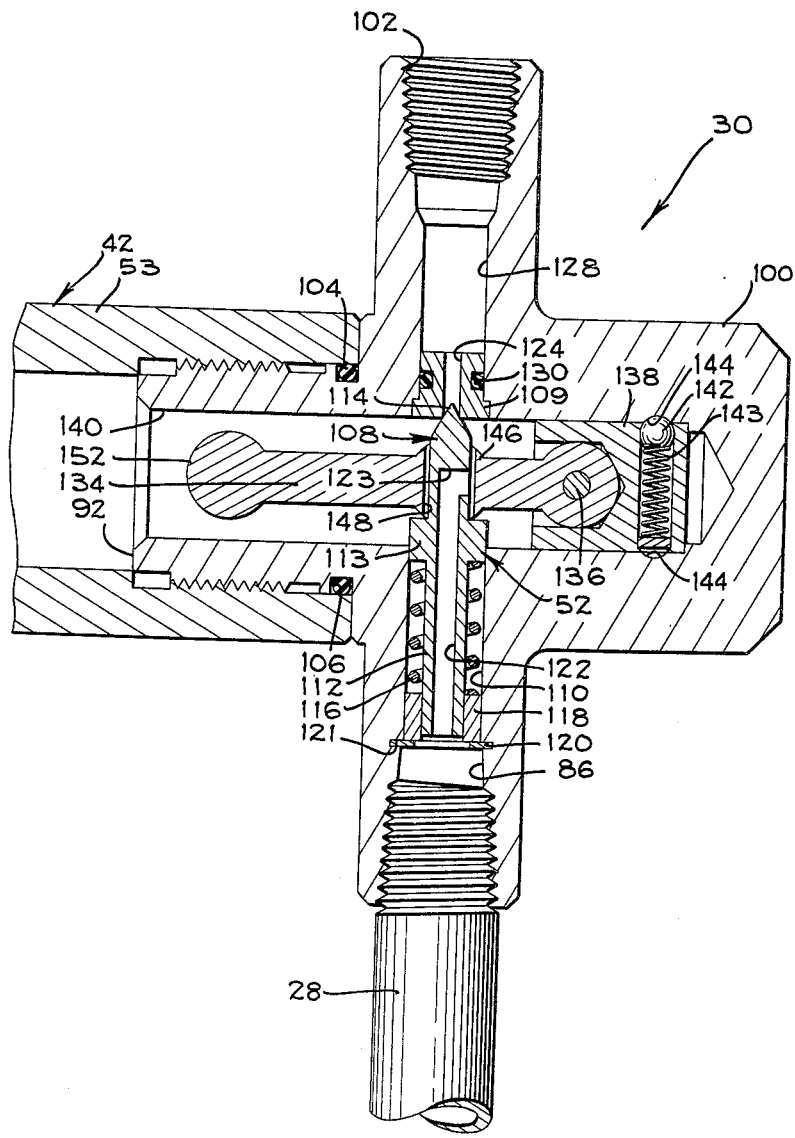

United States Patent Office  3,088,480
Patented May 7, 1963

3,088,480
FLOW CONTROL APPARATUS
John R. Yancey, Houston, Tex., assignor, by mesne assignments, to FMC Corporation, San Jose, Calif., a corporation of Delaware
Filed Sept. 7, 1960, Ser. No. 54,460
8 Claims. (Cl. 137—116)

This invention pertains to fluid handling apparatus and more particularly relates to automatically actuated valves for flow lines.

An object of this invention is to provide an improved valve operable in response to changes in differential pressures.

Another object of the invention is to provide improved apparatus for isolating a flow line section from pressurized fluid during the removal and replacement of a flow restricter in the section.

Another object is to provide apparatus for isolating a flow line section from pressurized fluid both upstream and downstream of the section in response to the closing of a valve connected into the section at the upstream end thereof.

Another object of the invention is to provide apparatus for automatically isolating a flow line section in response to the closing of a flow valve connected at the upstream end thereof and automatically bleeding pressure from said isolated section.

Another object of the invention is to provide apparatus for opening a flow passage through two series-connected closed valves in a flow line in response to the opening of the upstream valve.

Another object of the invention is to provide apparatus which eliminates a common cause of human error from the process of replacing a choke in a high-pressure flow line, thereby greatly increasing the safety of such an operation.

These and other objects and advantages of the invention will be apparent from the following description taken in conjunction with the accompanying drawings, in which:

FIG. 1 is a partly broken away elevation of a typical well Christmas tree having two wings thereon. The left wing illustrates the arrangement of valves used heretofore, and the right wing illustrates the valve of the present invention and the arrangement used therewith.

FIG. 2 is a diametric section through a valve constructed in accordance with the present invention, the valve being shown in its open position.

FIG. 3 is a view similar to FIG. 2 and showing the valve in closed position.

FIG. 4 is a fragmentary section taken on line 4—4 of FIG. 2.

FIG. 5 is a fragmentary section taken on line 5—5 of FIG. 2.

FIG. 6 is an enlarged fragmentary section of a portion of the valve shown in FIG. 2.

A typical flow control assembly heretofore used in the "Christmas tree" type of wellhead equipment is incorporated in the wing at the left side of FIG. 1. It comprises a flow restricter or choke located in an L-shaped housing 6 connected to a Christmas tree 7 through a wing valve 8. A short nipple 9 connects the choke housing 6 to a manually operable flow line valve 10. When using this apparatus and it becomes necessary to replace the choke, the wing valve 8 should be closed, and then the flow line valve 10 closed, in that order. The pressurized fluid trapped in the choke housing 6 between the valve 8 and the valve 10 can then be bled off through a manually operated needle valve 11 connected to the choke housing to reduce the pressure therein to equal the ambient pressure. When the pressure in the choke housing has dropped to approximately atmospheric, a knock-off choke cover 12 can be unscrewed from the choke housing and the choke replaced.

It sometimes happens that an operator assigned to change a choke forgets to perform the steps in the recited order or makes other errors in judgment. Too often the result is that the choke cover 12 is unscrewed while high pressure remains within the choke housing 6, and the pressurized fluid escaping, or the cover flying through the air, causes bodily injury.

In the flow control assembly of the present invention, illustrated in the wing of the Christmas tree 7 shown on the right of FIG. 1, a manually operated wing valve 16 is connected to a choke assembly 17 including a housing 18 and a choke 20 therein. A nipple 22 connects the outlet of the choke housing 18 with a valve 24 constructed in accordance with the present invention. The outlet of the valve 24 is connected to the flow line 26. A small-diameter, high-pressure tubing 28 connects the choke housing 18 upstream of the choke 20 to a pressure unloading unit 30 which forms part of the valve 24 of the invention. A removable cover 32 is provided on the choke housing 18 to permit removal and replacement of the choke 20 when the pressure in the choke housing has been reduced to the ambient pressure.

When fluid is flowing through the valve 16, the choke 20 and the valve 24, a pressure differential exists on the opposite sides of the choke 20 as a result of the restriction to the flow therethrough. According to the invention, the pressure differential is reflected in the nipple 22 and the high pressure line 28 and maintains the valve 24 in its open position. When the valve 16 is closed so that there is no longer any flow through the choke 20, the pressure on the opposite sides of the choke will equalize. When the pressures in the nipple 22 and the high-pressure tubing 28 are equal, the valve 24 automatically closes in the manner described hereinbelow. When the valve 24 closes, it automatically actuates the pressure unloading unit 30 to open the tubing 28 to atmosphere and thus bleed the pressure from within the choke housing 18. As soon as there is no longer any fluid flow from the outlet of the pressure unloading unit 30, the operator knows that it is safe to remove the cover 32 from the choke housing 18 and replace the choke therein.

The automatic valve 24 (FIGS. 2, 3 and 4) of the present invention comprises a housing 34 having an inlet 36 connected by the nipple 22 to the choke housing 18, and having an outlet 38 connected to the flow line 26. The valve 24 includes an actuator unit 42 which is operable to open or close the flow passage F through the housing 34 by positioning a ball carrier unit 44 relatively to the flow passage F. In one position of the ball carrier unit 44, illustrated in FIG. 2, a flow passageway 46 therethrough is aligned with the inlet 36 and the outlet 38 to permit free flow through the flow passage F in the housing 34, and in the other position, illustrated in FIG. 3, a ball valve 48 is aligned with the inlet 36 and seats against an annular seat 50 therein to prevent backflow of fluid from the flow line 26 into choke housing 18. The actuator unit 42 also controls the positioning of a needle valve assembly 52 (FIGS. 2, 3 and 6) in the pressure unloading unit 30, and as the actuator unit 42 moves the ball carrier unit 44 to position the ball valve 48 in alignment with the seat 50, it concurrently opens the needle valve assembly 52 in the pressure unloading unit 30 and permits the needle valve assembly 52 to bleed pressure from the choke housing 18 through the connecting tube 28.

The actuator unit 42 (FIGS. 2 and 3) comprises a cylinder 53 having an annular flange 54 on one end thereof which abuts a circular plate 55. The palte 55 is located adjacent an annular shoulder 56 in a lateral extension 34' of the valve housing 34. A gland nut 57 surrounds the cylinder 53 and abuts the flange 54 thereon and is screwed into suitable threads in the housing extension 34' to maintain the annular flange 54 and the plate 55 against the annular shoulder 56. An O-ring 58 mounted in a circumferential groove 60 on the peripheral surface of the flange 54 seals the cylinder 53 to the valve housing 34.

A piston 62 operates within the actuator cylinder 53. The piston 62 includes a circular head 63 having an O-ring 64 in a circumferential groove 65 therein. The O-ring 64 seals the piston to the inner cylindrical wall of the cylinder 53. A central hole 66 in the circular plate 55 permits the piston rod 67 to reciprocate in a chamber 68 within the extension 34' of the valve housing 34. An annular shoulder 69 on the piston rod 67 is adapted to abut the plate 55 to limit travel of the piston to the left as viewed in FIGS. 2 and 3. The piston rod 67 is connected by a pin 70 to the ball carrier unit 44.

The ball carrier unit 44 (FIGS. 2, 3 and 4) has a square cross-sectional configuration. The ball carrier unit 44 is guided for movement in the valve housing 34 by several flat surfaces 73 (FIGS. 2, 3 and 4) within the latter, and its position in relation to the flow passage F in the housing 34 is controlled by the actuator unit piston 62.

The ball carrier unit 44 includes the above mentioned circular flow opening 46 adjacent one end thereof, and the above mentioned ball check valve 48 located in an opening 78 adjacent the other end thereof. A spring 80 abuts an annular shoulder 82 in the opening 78 and urges the ball check valve 48 out of the opening 78. When the ball carrier unit 44 is in its position shown in FIG. 3, the spring 80 urges the ball into sealing engagement with the replaceable annular seat 50, located in the housing 34 adjacent the inlet 36. It will be apparent that the ball check valve 48 prevents flow from the outlet 38 toward the inlet 36 when it is positioned in alignment with the seat 50 as illustrated in FIG. 3.

The fluid pressure P1 (FIG. 1) occurring ahead of the choke 20 is appreciably higher than the pressure P2 occuring downstream from the choke in the nipple 22. P1 will, of course, remain greater than P2 so long as fluid flows through the wing valve 16 into the nipple 22 through the choke 20.

Fluid at pressure P1 is communicated through the high pressure tubing 28 to the inlet 86 (FIGS. 2, 3 and 6) of the pressure unloading unit 30. As will presently be explained, fluid at pressure P1 is communicated from the inlet 86 into the cylinder 53 of the actuator unit 42, where it acts on the head 63 of the piston 62. Fluid at approximately the lower pressure P2 is communicated from within the valve housing 34 through a hole 88 in the plate 55 into the cylinder 53 where it acts on the underside of the piston head 63 to resist the effect of the fluid at pressure P1 above the piston. A compression spring 90 is under compression between the plate 55 and the piston head 63 and also tends to counteract the effect of the pressure P1 upon the piston head 63.

When the wing valve 16 is open the fluid pressure P1 upon the piston head 63 is effective to overcome the counterforce of the fluid pressure P2 and the spring 90, and therefore the piston 62 is moved to the extent permitted by the shoulder 69 to align the flow opening 46 in the ball carrier 44 with the flow passage F through the valve housing 34 as illustrated in FIG. 2.

When the wing valve 16 (FIG. 1) is closed, the fluid pressure in the choke housing 18 upstream of the choke 20 will drop until P1 equals P2, thus fluid at pressure P2 will exist on both sides of the head 63 of the piston 62. When this condition occurs, the compression spring 90 (FIGS. 2 and 3) expands and moves the piston 62 in the cylinder 53 to the extent permitted by the piston head 63 abutting a surface 92 on the pressure unloading unit 30. This position of the piston is illustrated in FIG. 3, and in this position the piston 62 will have moved the ball check valve 48 in the ball carrier unit 44 into alignment with its seat 50. The ball check valve 48 is immediately forced by the spring 80 to engage and seal against seat 50 and the ball therefore prevents any fluid at pressure P2 from flowing from the flow line 26 back into the choke housing 18.

The pressure unloading unit 30 (FIG. 6) comprises a housing 100 having the inlet opening 86 and a bleeder opening 102. The housing 100 is screwed into the cylinder 53 of the actuator unit 42 and is sealed thereto by an O-ring 104 in a circumferential groove 106.

The needle valve assembly 52 comprises a needle valve 108 and a seat member 109. The needle valve 108 is slidably received in a bore 110 communicating with the inlet opening 86. The needle valve 108 includes a shank portion 112, a flange portion 113, and a point portion 114. A compression spring 116 surrounds the shank portion 112 and tends to expand between the flange portion 113 and an annular bushing 118, urging the needle valve 108 toward the seat member 109. The annular bushing 118 receives the end of the shank portion 112 for sliding movement therein. The bushing 118 is retained in the bore 110 by a snap ring 120 which is located in a suitable groove 121 in the side wall of the inlet opening 86. A fluid flow passage 122 is drilled longitudinally of the shank of the needle valve 108 and terminates in an opening 123 through the side wall of the needle valve 108 near the point 114 thereof. Pressure fluid is communicated from the inlet 86 into the cylinder 53 through the fluid flow passage 122 and the opening 123.

The needle point 114 is aligned to cooperate with a drilled central opening 124 in the seat member 109 of the needle valve assembly 52. The opening 124 is of smaller diameter than the passageway 122 as seen in FIG. 6. The seat member 109 is located in a bore 128 communicating with the bleeder opening 102 of the pressure unloading unit 30. The seat member 109 is sealed to the bore 128 by an O-ring 130.

The needle valve assembly 52 is closed by action of the spring 116 and is opened by the rocking of a lever 134 about a pivot pin 136. The pivot pin 136 is mounted in a hanger unit 138 which is located in a cylindrical bore 140 in the housing 100 (FIGS. 2, 3, 5 and 6). The hanger unit 138 is retained in position in the bore 140 by a ball detent 142 which is urged by a spring 143 to engage a circumferential groove 144 in the side wall of the bore 140. The lever 134 includes an enlarged central knob 146. A hole 148 drilled laterally through the knob loosely surrounds the needle valve 108 adjacent the fluid flow passage opening 123 and permits the knob 146 to contact the flange portion 113 of the needle valve 108 without obstructing the opening 123.

The needle valve 108 is disengaged from the seat member 109 to thereby open the needle valve by the action of an inclined camming surface 150 (FIGS. 2 and 3) on the head of the piston 62 engaging and moving the rounded distal end 152 of the lever 134. As the piston 62 moves to its position illustrated in FIG. 3, the inclined surface 150 contacts the rounded end 152 and rocks the lever 134 counterclockwise as viewed in FIGS. 2, 3 and 6, about its pivot pin 136 to cause the knob 146 to engage the flange portion 113 of the needle valve 108 and move the point 114 thereof out of engagement with the seat member 109.

The mechanical interaction of the parts is such that when the wing valve 16 is closed, the ball check valve 48 closes the flow passage F first, followed immediately by the opening of the needle valve assembly 52. The opening of the needle valve assembly 52 permits the fluid pressures to quickly bleed off from the side of the piston head 63 nearer the needle valve, and from within the choke housing 18. The operator can determine by the presence or absence of flow from the bleeder opening 102 of the pressure unloading unit 30 whether or not the pressure in the choke housing is substantially atmospheric. When fluid no longer flows from the bleeder opening 102, the choke cover 32 can be safely removed.

After the choke 20 has been replaced and the choke cover 32 has been reinstalled on the choke housing 18, the operator can restore flow from the Christmas tree 10 to the flow line 26 merely by opening the wing valve 16. When the valve 16 is opened, the fluid pressure communicated into the inlet 36 of the valve 24 forces the check ball 48 off of the seat 50 and flow occurs past the ball thus re-establishing the P1, P2 pressure differential across the choke 20. Fluid at pressure P1 is again conducted through the tubing 28 and through the pressure unloading unit 30 into the actuator unit 42 where it acts on the piston 62. Pressure builds up in the actuator 42 since fluid enters through the large passage 122 faster than it can bleed through the smaller passage 124. The pressure thus built up is sufficient to cause initial movement of the piston 62 since the spring 90 is in its extended state and is not effecting much resistance to initial movement of the piston 62. Initial movement of the piston from its position of FIG. 3 toward its position of FIG. 2 causes the inclined surface 150 to move away from the rounded end 152 of the lever 134 and the spring 116 moves the needle valve assembly 52 into the seat member 109. With the needle valve assembly 52 closed, no further bleeding occurs and full P1 pressure is applied without diminution to the top of the piston. The fluid at pressure P1 exerts sufficient force on the piston head 63 to overcome the force exerted by the fluid at pressure P2 and the distended spring 90, and thus move the piston 62 to align the flow opening 46 in the ball carrier 44 with the flow passage F in the housing 34, thus permitting full flow from the Christmas tree 10 into the flow line 26.

While a preferred embodiment of the present invention is described herein, it should be noted that changes may be made therein without departing from the spirit of the invention as defined in the appended claims.

The invention having thus been described, what is claimed as new and desired to be protected by Letters Patent is:

1. A flow control system comprising first and second valves, a choke assembly, means connecting said valves and choke assembly in series with each other with the choke assembly between the valves, said choke assembly receiving fluid flow from said first valve and discharging the fluid flow at reduced pressure to said second valve, means movable in response to a pressure differential on opposite sides thereof for operating said second valve, means for subjecting one side of said movable valve operating means to the fluid pressure within said second valve, means for subjecting the other side of said valve operating means to the fluid pressure between said first valve and said choke assembly, a bleed valve connected to said choke assembly, and means connected to said valve operating means to open said bleed valve when said valve operating means closes said second valve to reduce the pressure in said choke assembly to the ambient pressure.

2. A flow control system comprising a first valve, a choke assembly, and a second valve connected into a flow line in series, a valve actuator for said second valve, a bypass conduit connecting one side of said valve actuator to the upstream side of said choke assembly, means for applying the pressure within said second valve to the other side of said valve actuator, the pressure in said bypass conduit normally being effective to move said second valve to its open position against the pressure within said second valve, said valve actuator comprising means to automatically close said second valve in response to decrease of the difference between the pressure in the bypass conduit and that within said second valve below a predetermined value to isolate the portion of said flow line which includes said choke assembly from the remainder of said line, a bleed valve assembly connected to said choke assembly, and means connected to said valve actuator and operatively associated with said bleed valve to open the same when said second valve closes to reduce the pressure within said choke assembly.

3. A flow control assembly comprising, a first valve, a choke assembly connected to the outlet of said first valve, an automatic valve connected between the outlet of said choke assembly and a flow line, a valve actuating assembly for said automatic valve including a piston, means for exposing one side of said piston to a first pressure equal to the pressure of the fluid within said automatic valve thereby tending to close said automatic valve, means for conducting a second fluid pressure from a point upstream of said choke assembly to the other side of said piston, said choke assembly maintaining said first pressure less than said second pressure and thereby being effective to retain said automatic valve open whenever fluid is flowing through said choke assembly, and spring means acting against said one side of said piston to close said automatic valve and thereby isolate the choke assembly from the pressure upstream of said first valve and downstream of said automatic valve when the difference between said first and second pressures falls below a predetermined value in response to the closing of said first valve.

4. A flow control assembly comprising, a first valve, a choke assembly connected to the outlet of said first valve, an automatic valve connected between the outlet of said choke assembly and a flow line, a valve actuating assembly for operating said automatic valve, said actuating assembly including a piston, means for exposing one side of said piston to a first pressure equal to the pressure of the fluid within said automatic valve thereby tending to close said automatic valve, bypass conduit means for conducting a second fluid pressure from a point between said choke assembly and said first valve to the other side of said piston, said choke assembly maintaining said second pressure greater than said first pressure and thereby being effective to maintain said automatic valve in open condition whenever fluid is flowing through said choke assembly, spring means acting against said one side of said piston to automatically close said automatic valve and thereby isolate the choke assembly from the pressures upstream of said first valve and downstream of said automatic valve when the difference between said first and second pressures falls below a predetermined value, a bleed valve in said bypass conduit, and means carried by said piston to open said bleed valve when said automatic valve is moved to closed position to automatically bleed fluid pressure from said choke assembly.

5. A flow control assembly comprising, a first valve, a choke assembly connected to the outlet of said first valve, an automatic valve connected between the outlet of said choke assembly and a flow line, a valve actuating assembly for said automatic valve responsive to differential pressure above a predetermined value to shift said second valve to open position, means for conducting to one side of said actuating assembly, a first pressure equal to the pressure of the fluid flowing through said automatic valve means for conducting a second fluid pressure from a point upstream of said choke assembly to the other side of said actuating assembly, said choke assembly being effective to reduce the pressure of fluid flowing therethrough, said valve actuating assembly being effective to maintain said automatic valve in open condition when said first pressure exceeds said second pressure by a predetermined value, and means in said actuating assembly for closing said automatic valve when said differential pressure falls below said predetermined value to thereby isolate the choke assembly from the pressures upstream of said first valve and downstream of said automatic valve.

6. A flow control assembly comprising, a first valve, a choke assembly connected to the outlet of said first valve, an automatic valve connected between the outlet of said choke assembly and a flow line, a valve actuating assembly for said automatic valve responsive to differential pressure above a predetermined value to adjust said second valve to open position, means for conducting a first pressure equal to the pressure of the fluid flowing through said automatic valve to one side of said actuating assembly, bypass conduit, means for conducting a second fluid pressure from a point between said choke assembly and said first valve to the other side of said actuating assembly, said choke assembly being effective to make said first pressure less than said second pressure whenever fluid is flowing through the choke assembly, said valve actuating means being effective to maintain said automatic valve in open condition when said second pressure exceeds said first pressure by a predetermined value and means in said actuating assembly effective to automatically close said automatic valve and thereby isolate the choke assembly from the pressure upstream of said first valve and downstream of said automatic valve when said differential pressure falls below said predetermined value in response to the closing of said first valve, a bleed valve in said bypass conduit, and means connected to said actuating assembly adapted to open said bleed valve when said automatic valve is moved to closed position to automatically bleed fluid pressure from within said choke assembly.

7. A valve comprising a housing having inlet and outlet openings therein, a valve element movably mounted in said housing and having two passageways therein, a check valve means mounted in one of said passageways, a valve actuator mechanism connected to said housing and comprising a piston connected to said valve element and adapted to move the same to selectively position either of said passageways in alignment with said inlet and outlet openings, whereby when said check valve means is in such alignment said check valve means permits flow from said inlet to said outlet opening but prevents flow from said outlet to said inlet opening, means exposing one side of said piston to fluid pressure within said housing to urge said valve element to position the passageway having the check valve means therein in alignment with said inlet and outlet openings, and means for applying a greater fluid pressure to the other side of said piston to overcome the fluid pressure within said housing and thereby move the valve element to align the other of said passageways with said inlet and outlet openings.

8. A valve comprising a housing having inlet and outlet openings therein, a valve element slidably mounted in said housing and having two transverse passageways therethrough, a check valve means mounted in one of said passageways, a valve actuator mechanism connected to said housing and comprising a piston connected to said valve element and adapted to move the same to selectively position either of the passageways therethrough in alignment with said inlet and outlet openings, whereby when said check valve means is in such alignment said check valve means permits flow from said inlet to said outlet opening but prevents flow from said outlet to said inlet opening, means exposing one side of said piston to fluid pressure within said housing to urge said valve element to position the passageway containing the check valve means in alignment with said inlet and outlet openings, spring means acting on said piston in the same direction as the fluid pressure within said housing, and means for applying a second, greater fluid pressure to the other side of said piston to overcome said spring and the fluid pressure within said housing to move the valve element to align the other of said passageways with said inlet and outlet openings.

References Cited in the file of this patent

UNITED STATES PATENTS

| | | |
|---|---|---|
| 1,105,991 | Miller | Aug. 4, 1914 |
| 1,904,475 | Kissing | Apr. 18, 1933 |
| 2,028,177 | Williams | Jan. 21, 1936 |
| 2,538,281 | Snyder | Jan. 16, 1951 |
| 2,560,948 | Hannibal et al. | July 17, 1951 |